June 15, 1965    R. GELLER ETAL    3,188,932
SHUTTER OPENING AT HIGH SPEED
Filed Jan. 11, 1963
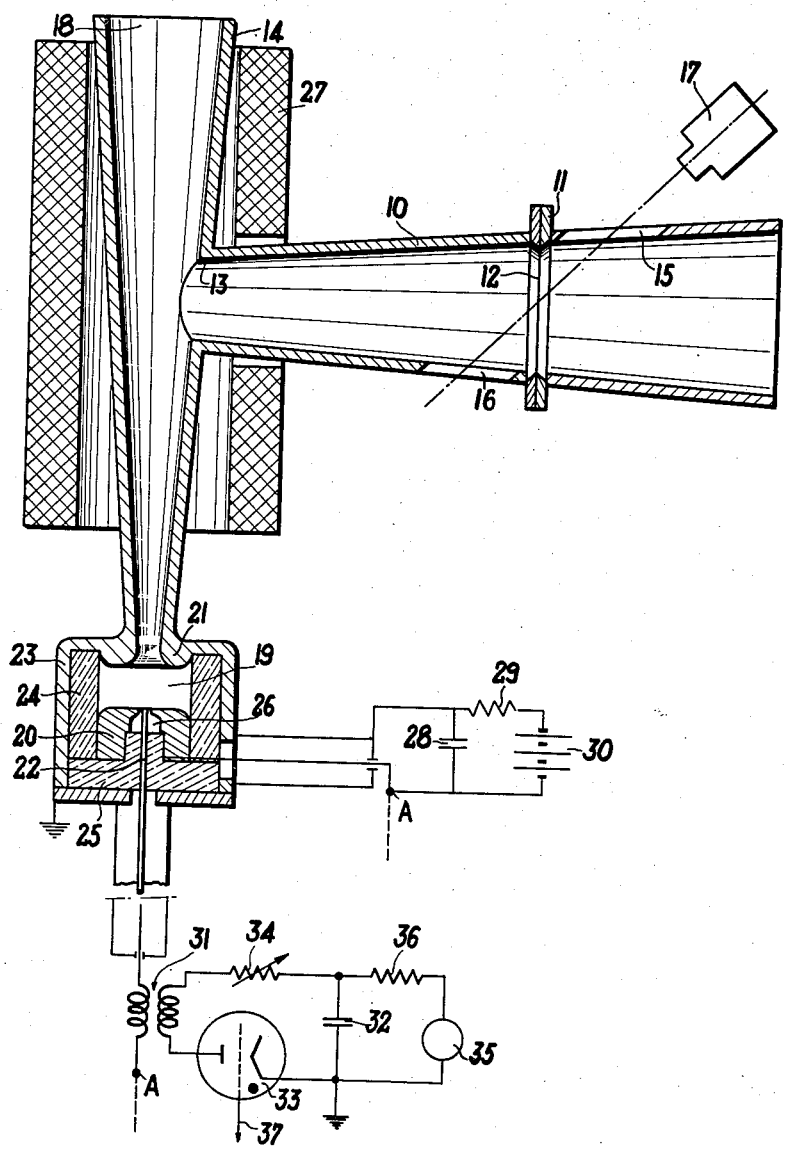
INVENTORS
RICHARD GELLER
JEAN LEROY
BY *Bacon & Thomas*
ATTORNEYS 3,188,932
SHUTTER OPENING AT HIGH SPEED
Richard Geller, 13 Ave. de Sceaux, Antony, and Jean Leroy, 48 Rue du Bel-Air, Le Perreux-sur-Marne, France
Filed Jan. 11, 1963, Ser. No. 250,889
Claims priority, application France, Jan. 15, 1962, 884,884
6 Claims. (Cl. 95—53)

The present invention relates to a shutter opening at high speed, chiefly—but not exclusively—applicable in high-speed cameras for recording the action of a luminous phenomenon in a very short period.

Present-day shutters opening at high speed generally make use of the phenomenon of the rotation of the plane of polarisation of the light by an electrical field set up between two parallel armatures. If two crossed polarisers are arranged along the light beam, one in front of the armatures and the other behind, there is total absorption of the light flux as long as the field is at zero, and only partial absorption as soon as the field is set up.

Unfortunately, since the rotation of the plane of polarisation is slight, such shutters have the disadvantage that they considerably attenuate the light beam and are thus unsuitable for recording phenomena whose luminous intensity is small: in most cases the absorption is of the order of 95% of the light flux.

An object of the invention is the provision of a shutter whose opening period is very short, and which, once opened, does not weaken the light flux.

With this in view, the invention proposes a shutter having a divergent tube opening into the atmosphere and provided with an opaque diaphragm located in the light beam to be intercepted, and means for creating a shock wave in the said tube, the said shock wave being of sufficient amplitude to rupture the diaphragm.

Further, the invention proposes a shutter having a first tube closed by an opaque diaphragm located in the light beam to be intercepted, and a second tube into which the first one opens transversely, the second tube being provided at one end with a discharge device to set up in it a shock wave accompanied by partial ionisation of the immediate environment, the movement of the said wave at right angles to the first tube compressing the neutral molecules in the latter to set up in it a shock wave having a non-ionised environment which then ruptures the diaphragm.

In order that the invention may be more readily understood, reference will now be made to the accompanying drawing which shows one particular embodiment thereof by way of a non-limiting example, the drawing showing a section of the shutter along its median plane, ancillary equipment being shown diagrammatrically.

Referring to the drawing, there is shown a shutter having a first tube 10 provided with a clamp 11 which grips an opaque diaphragm 12. The tube 10 is divergent, the larger end opening into the atmosphere and the other end 13 opening transversely into a second tube 14. Two holes 15 and 16 are made in the tube 10 on either side of the diaphragm 12, along an axis oblique to the axis of the tube. These holes provide a passage for a light beam to be observed once the diaphragm 12 has been ruptured. The observation may be made by means of a recording camera diagrammatically shown at 17, whose optical axis is on the axis of alignment of the holes 15 and 16. It will be appreciated that the arrangement shown schematically in the figure is in no way restrictive, and in some cases it may be preferable for the optical axis of the camera 17 to be located in a perpendicular plane instead of in the median plane of the assembly of the two tubes 10 and 14. In all cases, it is advantageous to keep an angle of the order of 45° between the axis of the tube 10 and the optical axis of the camera.

The creation of a shock wave spreading from the end 13 towards the open end of the tube 10, is effected by the movement at right angles to the end 13 of a primary shock wave traversing the tube 14. This primary wave is set up by an ionising device arranged at one end of the tube 14 whose other end 18 is open to the atmosphere. This device has a compression chamber 19 arranged between the poles 20 and 21 of a spark-gap. Pole 21, for example, constitutes an earthed electrode, while pole 20, insulated from the former, is raised to a high potential. The discharge between the poles is initiated by an auxiliary electrode or igniter 22 located in the axis of the pole 20, which is of annular shape and from which it is electrically insulated. The tube 14 is fixed to the earthed pole 21, through which it opens into the chamber 19, and to the casing 23 enclosing the device.

The electrode 20 is separated from the casing 23 by an insulating sleeve 24 and a plate 25. The plate 25 also insulates the igniter and ensures the centering of the latter in the central cavity 26 of the pole 20.

Arranged round the tube 14 is a coil 27 whose axial magnetic field focuses the ions and electrons along the axis of the tube and prevents them from escaping in the direction of the tube 10, where they would create interfering light. In any case, the inside of the tubes 10 and 14 is preferably made matt black to avoid reflections which might mask the phenomenon to be observed.

The ionising device is fed by an electrical circuit shown schematically in the drawing and comprising a capacitor 28 charged through a charge resistor 29 by a high tension source 30. One of the terminals of the capacitor is connected by the central conductor of a coaxial cable to the pole 20, while the outer conductor of the coaxial cable is connected to the earthed electrode 21. The igniter 22 is fed by a circuit of any desired or well-known kind which may, for example, consist of a transformer 31 whose primary winding is connected in a circuit comprising—in series—a capacitor 32, a thyratron valve 33 and a variable resistor 34 for adjusting the circuit parameters to the critical level; the capacitor 32 is charged by a high tension generator 35 through a resistance 36. The transmission of a pulse by the conductor 37 to the thyratron grid fires the thyratron, causing a discharge in the circuit, which is transferred by induction to the secondary coil of the transformer 31 and sets up a disruptive tension between the igniter 22 and pole 20.

The device operates as follows: before causing the shutter to open, the operator energises the focussing coil 27 and charges up the capacitor 28. Putting the igniter 22 under tension causes a discharge between the igniter 22 and the electrode 20, and this discharge passes immediately to the electrode 21. The discharge of the capacitor 28 ionises the gas throughout the chamber 19; hence there is a rise in temperature, pressure increases and a shock wave is created. This shock wave passes into the tube 14, which has a divergent shape so that the wave spreads along it an increasing speed. During the spread of the wave, there is an ionisation which creates an intense interfering glow in the tube. Hence it would not be possible to insert the diaphragm 12 directly in tube 14 as the phenomenon to be observed would be masked, particularly if it gave rise to an emission of weak luminosity.

As it passes in front of the end 13 of the tube 10, the shock wave compresses the neutral molecules contained therein, setting up a secondary shock wave which spreads at increasing speed along the divergent tube 10. The magnetic field focuses the ions and electrons along the tube 14 and prevents them from entering tube 10, where they might cause the emission of interfering light. At the moment the shock wave arrives at the diaphragm 12, interfering light in the tube 14 has stopped being emitted opposite the tube 10. Thus the camera 17 is not sensitive to the direct emission, provided it is placed beyond the diaphragm 12. As the inside of the tubes 14 and 10 is black, light reflected by the walls, and threatening to hide the phenomenon, is very slight.

It is obvious that the same shutter cannot also intercept the light beam at the end of the observation period, and a shutter closing at high speed (an explosive shutter, for example) must be provided.

The delay between the excitation of the igniter 22 and the rupture of the diaphragm 12 can be determined, since the time taken by the shock wave to cover the distance between the chamber 19 and the diaphragm 12 can be calculated and the time necessary for the complete rupture of the diaphragm can be evaluated experimentally.

By way of example: a shutter in accordance with the invention has been made in which the chamber is ionised by a capacitor 28 of the order of 2.5 μf. charged at 20,000 v. The assembly of tubes and casing 23 is brass, and the diaphragm 12, held between two clamps, each of which is integral with one of the two component parts of the tube 10, is aluminum foil.

It will be understood that the invention has been described by way of example only and that various modifications may be made to the specific details referred to without in any way departing from its scope.

We claim:

1. A high-speed shutter for use in a high-speed camera or the like, comprising a first tube opening into the atmosphere and provided with an opaque transverse diaphragm interposed in a light beam to be intercepted, and a second tube into which said first tube opens transversely, provided at one end with a discharge device to set up a shock wave having an ionized environment in said second tube, the movement of the said shock wave at right angles to said first tube setting up a shock wave having a neutral environment in the latter.

2. A shutter as claimed in claim 1, wherein said discharge device includes a compression chamber enclosed by two electrodes and a capacitor whose discharge between the two electrodes sets up the said shock wave in the heart of the atmosphere of the chamber.

3. A shutter as claimed in claim 2 wherein said discharge device has an igniter to initiate the discharge in the chamber.

4. A shutter as claimed in claim 1, wherein a focusing coil is arranged axially about said second tube to set up a field preventing the ions and electrons in said second tube from escaping in said direction of the first tube.

5. A shutter as claimed in claim 1 wherein said second tube has a cross section which increases from the end at which it opens into the compression chamber towards its other end, said other end being open to the atmosphere.

6. A shutter as claimed in claim 1 wherein said first tube is provided with two windows to allow the luminous beam to be recorded to pass through, said windows being arranged on either side of the diaphragm and being aligned along an axis which with the axis disposed at an angle on the order of 45 degrees with respect to the axis of said first tube.

References Cited by the Examiner

Article, "Pneumatically Driven Shutter for High Speed Cameras," by Muirhead and McCollum, Journal of Scientific Instruments, vol. 38, June 1961, page 264.

JOHN M. HORAN, *Primary Examiner.*